(12) United States Patent
Lee

(10) Patent No.: US 7,451,322 B2
(45) Date of Patent: Nov. 11, 2008

(54) USER AUTHENTICATION METHOD USING PASSWORD

(75) Inventor: Kun-Hak Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 760 days.

(21) Appl. No.: 10/260,426

(22) Filed: Oct. 1, 2002

(65) Prior Publication Data
US 2003/0172281 A1    Sep. 11, 2003

(30) Foreign Application Priority Data
Mar. 5, 2002    (KR)    ............................... 2002-11496

(51) Int. Cl.
*H04L 9/32*    (2006.01)

(52) U.S. Cl. ....................... 713/183; 713/182; 713/165; 726/5; 726/14; 726/18

(58) Field of Classification Search ................. 713/169, 713/193, 183, 184, 182, 165, 186, 187; 726/2, 726/5, 7, 14
See application file for complete search history.

(56) References Cited

U.S. PATENT DOCUMENTS

| | | | |
|---|---|---|---|
| 5,204,966 A * | 4/1993 | Wittenberg et al. | 726/6 |
| 5,724,423 A * | 3/1998 | Khello | 713/184 |
| 5,787,169 A * | 7/1998 | Eldridge et al. | 713/165 |
| 6,079,021 A * | 6/2000 | Abadi et al. | 726/14 |
| 6,178,508 B1 * | 1/2001 | Kaufman | 713/183 |
| 6,480,958 B1 * | 11/2002 | Harrington | 713/184 |
| 6,567,919 B1 * | 5/2003 | Yanagihara et al. | 726/7 |
| 6,643,784 B1 * | 11/2003 | McCulligh | 726/18 |
| 6,904,526 B1 * | 6/2005 | Hongwei | 713/182 |
| 6,954,862 B2 * | 10/2005 | Serpa | 726/5 |
| 6,990,586 B1 * | 1/2006 | Tresser et al. | 713/182 |
| 7,069,584 B1 * | 6/2006 | Davis | 726/5 |

(Continued)

FOREIGN PATENT DOCUMENTS

CN    1358921 A    7/2002

(Continued)

*Primary Examiner*—Nasser Moazzami
*Assistant Examiner*—Shanto M Abedin
(74) *Attorney, Agent, or Firm*—Robert E. Bushnell, Esq.

(57) ABSTRACT

A user authentication method includes the steps of: inputting, by a user, a predetermined password having a plurality of digits; examining whether an input password includes an actual password that is predetermined by using less digits than the input password; authenticating the input password if the input password includes the actual password; and refusing to authenticate the input password if the input password does not include the actual password. The user authentication method using the password is very useful for reinforcing the security by applying a simple processing, not necessarily consuming high costs and much time. Further, even when the password may be exposed to others, it is still safe. Also, although a password may be used in many cases in common, the security still can be reinforced by differentiating the input password. Most of all, the user can remember the actual password very easily, and yet get the same effect with changing the password.

11 Claims, 2 Drawing Sheets

U.S. PATENT DOCUMENTS

| | | | |
|---|---|---|---|
| 2001/0004759 A1* | 6/2001 | Heikki | 713/202 |
| 2002/0067832 A1 | 6/2002 | Jablon | |
| 2002/0069104 A1* | 6/2002 | Beach et al. | 705/14 |
| 2002/0083347 A1 | 6/2002 | Taguchi | |
| 2002/0087890 A1* | 7/2002 | Chan et al. | 713/202 |
| 2002/0087892 A1 | 7/2002 | Imazu | |
| 2003/0037262 A1* | 2/2003 | Hillhouse | 713/202 |
| 2003/0105964 A1* | 6/2003 | Brainard et al. | 713/178 |

FOREIGN PATENT DOCUMENTS

| | | |
|---|---|---|
| JP | 2002-55958 | 2/2002 |
| WO | WO 02/45339 | 6/2002 |

* cited by examiner

USER AUTHENTICATION METHOD USING PASSWORD

CLAIM OF PRIORITY

This application makes reference to, incorporates the same herein, and claims all benefits accruing under 35 U.S.C. §119 from my application entitled USER AUTHENTICATION METHOD USING PASSWORD filed with the Korean Industrial Property Office on 5 Mar. 2002 and there duly assigned Serial No. 2002-11496.

BACKGROUND OF THE INVENTION

1. Field of the Invention

The present invention relates generally to a user authentication method, and in particular, to a user authentication method using a password.

2. Description of the Related Art

In general, user authentication (authentification) to confirm a user is conducted when usage approval needs to be granted to the user who is permitted to use an on-line service, a locking device, or a security device. To confirm the user's identification with absolute certainty, anything that only the user is aware of or owns, or the user's physical characteristics or personal habits could be used. The most basic and general one among those is a password composed of characters that are known to the user only. The characters here include letters, numbers, symbols, signs etc.

In case of using those kinds of passwords for user authentication, it is necessary to make a very advanced password in order to reinforce the security thereof. To this end, encipherment algorithm method requiring a very complex mathematical operation has been widely used. Especially when a higher security policy is requested, a much more advanced mathematical operation or a combination using probability calculation was used.

Naturally, the conventional encipherment system, which is based on a complicated mathematical algorithm, required high costs, much time and fast processing. However, in a case where the high security policy is not requested but only a simple encipherment procedure is, because the case does not need an advanced password, the requirements aforementioned could be wasting overhead.

On the other hand, the problem of the authentication using a password is that, if, in any case, a user's password is exposed to another person, say, another person peeked at it while the user is inputting the password, or by some other reasons, the authentication using the exposed password worked anyway regardless of the user's identity. It is also true that most of users pick up very simple passwords that are easy to remember and use the same password in many other cases as well. Therefore, the password exposure itself can cause a personal information drain and further very serious social problems. Unfortunately though, when some people use very long-digit passwords in trying to make it difficult for other people to remember their passwords in case the passwords are exposed, they often end up forgetting their own passwords. Moreover, there are occasions that users are required to change their passwords after a certain period of time for sake of security. But still the users often lose their passwords because they were not careful enough to remember their new passwords, or many times they get confused. Then, the authentication refusals generated in such cases were solved through a separate procedure.

SUMMARY OF THE INVENTION

It is, therefore, an object of the present invention to provide a user authentication method, which can reinforce security by using a simple processing without spending high costs and much time.

Another object of the present invention is to provide a user authentication method, which is safe even when a password of a user is exposed to another person.

Still another object of the present invention is to provide a user authentication method, which can reinforce security by differentiating input passwords despite using one password in many other cases in common.

Yet another object of the present invention is to provide a user authentication method, which can help users to remember their passwords very easy and yet manifest password change effect at the same time.

To achieve the above and other objects, there is provided a user authentication method, which includes the steps of: inputting, by a user, a predetermined password having a plurality of digits; examining whether an input password includes an actual password that is predetermined by using less digits than the input password; authenticating the input password if the input password includes the actual password; and refusing to authenticate the input password if the input password does not include the actual password.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
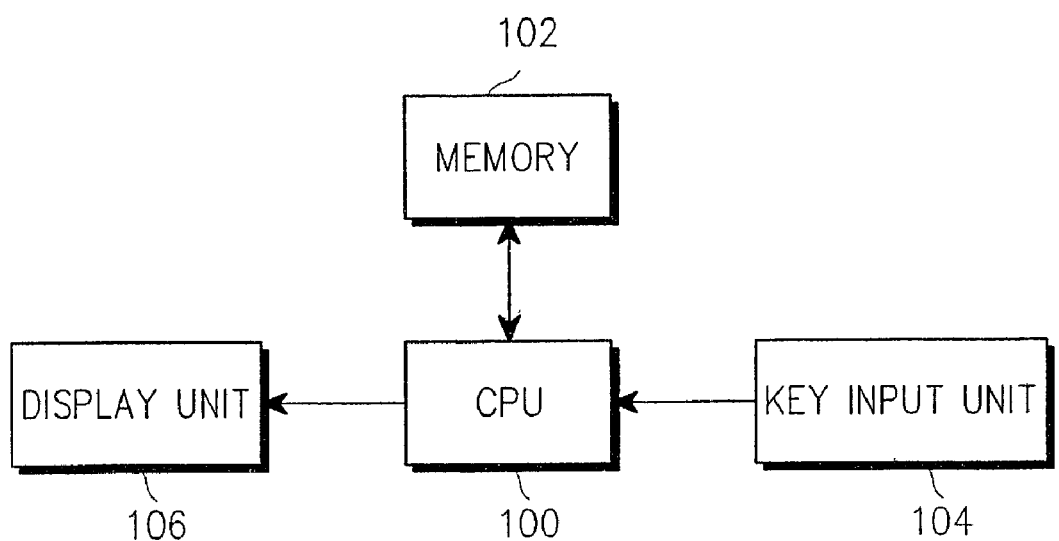
FIG. 1 is a block diagram illustrating a user authentication device to which the present invention is adopted.

FIG. 1 is a block diagram which roughly shows a user authentication device to which the present invention is adopted. When a user inputs a password through a key input unit 104 of the user authentication device shown in FIG. 1, central processing unit (CPU) 100 compares the password the user inputted with a prestored password in memory 102, and either approves the input password or refuses it, and this authentication result is displayed through a display unit 106.

Based on the authentication result, other kinds of operations, such as, log-in, usage approval, unlocking, entrance approval and so forth, are performed in corresponding equipments or instruments, mounted with the user authentication device shown in FIG. 1. Since these operations that are conducted according to the authentication result are well known, the details thereon are not provided here.

According to the present invention for use of the user authentication device, the input password that is inputted through a key input unit 104 by a user has a predetermined plurality of digits, and includes an actual password having less digits than the input password and a fake password. Here, the actual password means a password composed of characters that are predetermined by the user and the user authentication device. The actual password is stored in the memory 102. On the other hand, the fake password means a password composed of randomly chosen characters by the user. If the characters of the actual password are all included, regardless of their order or repetition, in the input password, the input password is approved, but if not, it is refused.

Typically, 8-digit password (combination of characters with numbers) has been widely used for the user authentication using the password. Considering the trend, in the following example, it is supposed that the input password has 16 digits, and an actual 8-digit password and a fake 8-digit password that are made by combining characters and numbers, like the conventional password, are randomly inputted regardless of the order.

Suppose that the actual password is "PSWD1234". Then the input password can be varied as follows. First, the order could be changed without any repetition, such as, '5<u>2</u>FG<u>PE</u> <u>4</u>YW<u>D</u>Q1<u>6S</u>0<u>3</u>'. Here, the bold and underlined '2P4WD1S3' is the actual password, and the rest, '5FGEYQ60' becomes the fake password. As another example, the order could be changed with repetition, such as, '2<u>2</u>F<u>DPE4</u>Y<u>WD</u>1<u>6SS</u>0<u>3</u>'. In this case, '2', 'D', and 'S' are repeated, and the bold and underlined '2DP4W1S3' is the actual password, and '2FEYD6S0' belongs to the fake password.

Figure 2:
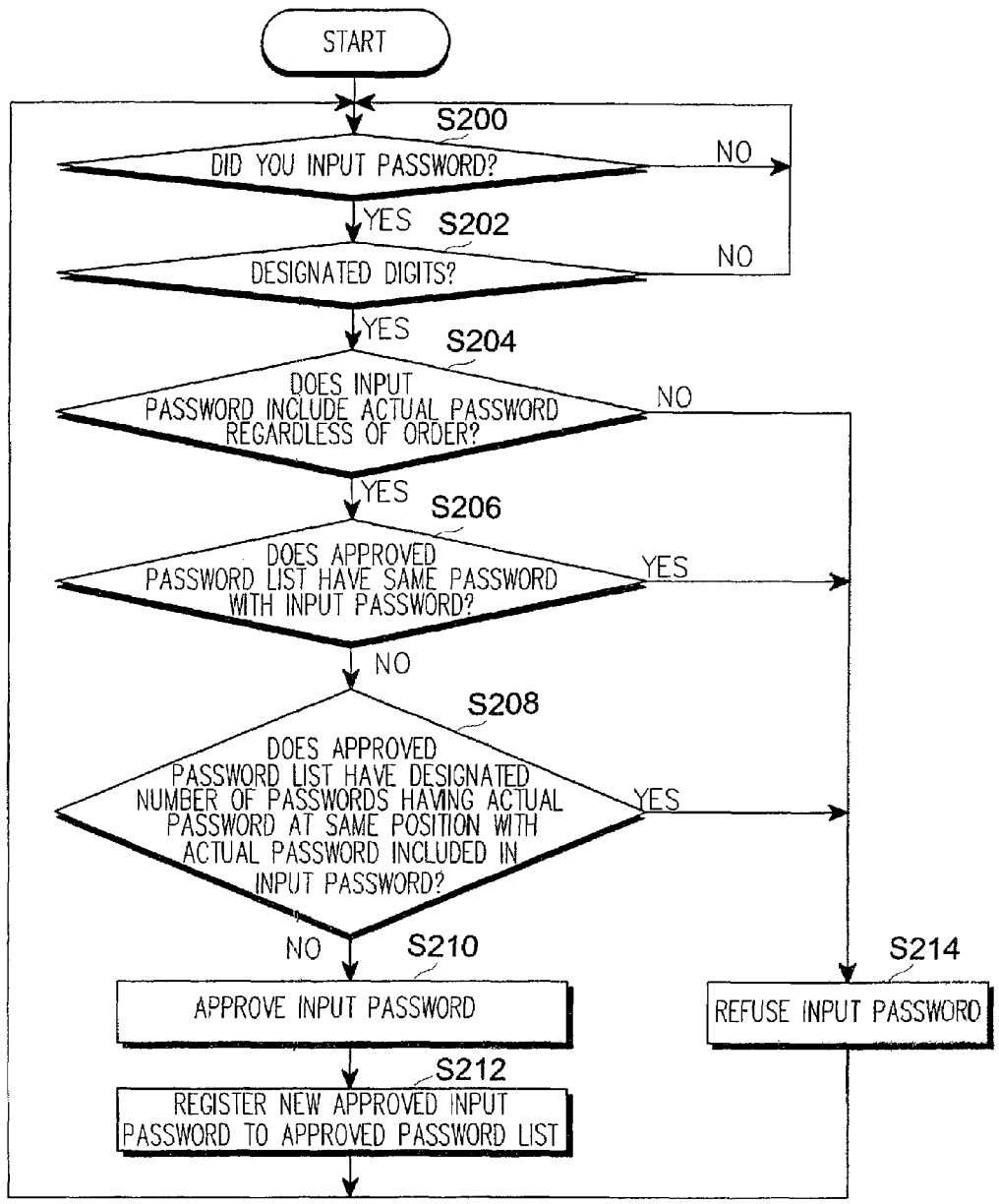
FIG. 2 is a flow chart explaining a user authentication procedure in accordance with a preferred embodiment of the present invention.

Having applied the present invention to the user authentication device of FIG. 1, FIG. 2 illustrates a flow chart of the user authentication procedure performed at the CPU 100, according to the preferred embodiment of the present invention. In step S200 a determination is made whether a user has input a password. Then in step S202, a determination is made whether the input password has a designated number of digits such as a 16-digit password. The input password as mentioned above includes the "actual password" and the "fake password." In more detail, first of all, when the user inputs a password through a key input unit 104, the CPU 100, supposing that a 16-digit password is inputted (S200 through S202), examines whether the predetermined actual passwords are all included in the input password, regardless of the characters' order (S204). At this time, the examination concerning whether all actual passwords are included in the input password regardless of the characters' order is accomplished by comparing the characters of the input password to those of the actual password one by one.

If it turns out that the actual password is all included in the input password, the next step S206 proceeds. But, if one single digit of the actual password is not included in the input password, the input password is refused (S214), and the previous step S200 continues. Generally, as an indication of refusal, a designated warning message is displayed to the user through the display unit 106. Even when the actual password is repeated as in '2<u>2</u>F<u>DPE4</u>Y<u>WD</u>1<u>6SS</u>0<u>3</u>', since the actual password is all included in the input password, the step S206 proceeds.

In step S206, it is examined whether the approved password list that is stored in the memory 102, like Table 1 below, has a password that is identical with the input password.

TABLE 1

| No | Approved passwords |
|---|---|
| 1 | 30S61QDWY4EPGF25 |
| 2 | A0187W2R3PSD4T5S |
| 3 | 3S1E7LG742FPDW58 |
| 4 | D42A3PS01HDW6D97 |
| . | . |
| . | . |
| . | . |
| 30 | 62ABPR4YWDQ16S03 |

The approved password list like Table 1 above is where recently approved passwords are registered. For example, in Table 1, it seems that 30 is the maximum number for registerable (able to register) passwords. The registerable number, 30, to the approved password list was determined based on the assumption that the user logs in once a day per month (30 days/month), and, if necessary, the number can be changed at any time.

As a result of the examination conducted in the step S206, if there is the same approved password with the input password in the approved password list, the step S214 proceeds, in which the input password is refused. Then, the step S200 proceeds again. As one example of such a case, suppose that the input password is '30S61QDWY4EPGF25', and the same approved password is already registered to the approved password list like the Table 1. That is, the approved password list has the same password, '30S61QDWY4EPGF25', with the input password, '30S61QDWY4EPGF25'. Therefore, if it is discovered that the approved password list has the same password with the input password already, the input password is refused, and the very same password ('30S61QDWY4EPGF25') cannot be reused or cannot be repeated, thereby reinforcing the security thereof.

In contrast, if the examination performed in the step S206 tells that there is no same approved password with the input password in the approved password list, it is examined whether there is an approved password on the list, the approved password including an actual password that has the same position with the actual password included in the input password (S208). For instance, suppose that the input password is '52FGPE4YWDQ16S03', and the actual password is 'WDQ16S03' out of the input password, and the approved password list like Table 1 has many approved passwords registered thereto. Here, the input password '52FGPE4YWDQ16S03' and one approved password in Table 1, '62ABPR4YWDQ16S03', has the actual password at the same position. Therefore, in the step S208, it is examined that whether the approved password list includes a certain number, say, five of approved passwords which have the actual password at the same position as in the input password. It is done so in order to get rid of any possibility of exposing the password because the actual password could be easily exposed to others if it is inputted at the same position over and over.

If it is found out that there are indeed a certain number of approved passwords in the list, having the actual password at the same position with the input password (S208), the input password is refused (S214). However, if it turns out that there are few, or less than the designated number of approved passwords having the actual password at the same position (S208), the input password is approved (S210), and the step S212 proceeds. The user is informed of such approval by an approval message that is displayed through the display unit 106. Similarly, other kinds of operations, such as, log-in, usage approval, unlocking, entrance approval and so forth, are performed in corresponding equipments or instruments, mounted with the user authentication device shown in FIG. 1.

In step S212, the newly approved input password is added to the approved password list like Table 1 as a new approved password, and then the step S200 proceeds. At this time, if the maximum number of registerable approved passwords is limited to 30 like before, and the approved password list is already filled with 30 approved passwords, the new approved password replaces the oldest one.

Therefore, what all the user needs to do is input a part of the actual password out of the input password once, regardless of the position, and randomly input the rest as the fake password. In this way, the user can easily remember the password, and is unlikely to lose it, yet enjoying the similar effect with inputting different passwords every time. Especially, the password can be a one-time-use password in that the recently inputted password is stored in the approved password list and is compared later. Nevertheless, because the actual password is kept, the user can be less confused by too frequent changes in the password, thereby increasing the convenience for the user.

As described above, no complicated mathematical algorithm is used in the present invention. Instead, using fake passwords to use a one-time-use input password, the present invention can reinforce the security of a password applying a simple processing, not necessarily consuming high costs and much time. Further, because a previously approved input password is refused, even when the input password may be exposed to others, it is still safe. Also, even when a password is used in many cases in common, the security still can be reinforced by differentiating the input password, and getting the same effect with changing the password. Most of all, the user only needs to remember the actual password and is less likely to forget it. While other people will have difficulties remembering the actual password since the input password has more digits than the actual password.

In conclusion, the present invention is applicable to many instruments or equipment requiring high security, and especially to the authentication procedure using a password, like personal identification and approval authentication as in home shopping through WEB or Internet, in which people could easily steal the password through hacking. Besides, the present invention can be applied to every kind of digital product, especially, to charged contents like set-top box or video on demand (VOD). Although the user lets his or her close friends see the ID (identity) or password, and has them do some kind of work, since the password is a one-time-use fake password, the user can continue to use the password without changing it.

While the invention has been shown and described with reference to a certain preferred embodiment thereof, for example, using 16-digit input password, having the actual password and the fake password to be made of 8 digits of combined characters and numbers, or using the approved password list to reinforce the security, it will be understood by those skilled in the art that various changes in form and details may be made therein without departing from the spirit and scope of the invention as defined by the appended claims.

What is claimed is:

1. A user authentication method using a password, the method comprising the steps of:
   inputting, by a user, a password including a predetermined number of digits, the inputted password including an actual fixed password and a fake password;
   examining whether an input password includes the actual password regardless of order or repetition thereof by using less digits than the input password and without considering the content of the fake password;
   examining, when the actual password is included in the input password, whether an approved password list has an identical approved password with the input password among at least one of the approved passwords that are registered to the list;
   examining, when the approved password list does not have the identical approved password with the input password, whether the approved password list has a designated number of approved passwords having an actual password at the same position with the actual password;
   approving the input password irrespective of content of the fake password when the approved password list has less than a predetermined number of approved passwords having an actual password at the same position with the actual password that is included in the input password;
   registering the approved input password to the approved password list as a new approved password; and
   refusing the input password when the input password does not include the actual password, or when the approved password list does not have any identical approved password with the input password, or when the approved password list has the predetermined number of the approved passwords having an actual password at the same position with the actual password that is included in the input; and
   wherein the input password comprises the actual password, and fake passwords that are randomly chosen and interspersed by the user.

2. The method as claimed in claim 1, with the examination step determining whether characters of the actual password are all included in the input password, regardless of order or repetition.

3. The method as claimed in claim 1, with the actual password and the fake password having the same number of digits.

4. The method as claimed in claim 2, with the actual password and the fake password having the same number of digits.

5. A method, comprising:
   determining whether an input password includes an actual password regardless of order or repetition thereof, the actual password being used for authentication, the inputted password including an actual fixed password and a fake password;
   determining whether the input password is included in an approved password list without considering content of the fake password;
   determining whether the approved password list includes a predetermined number of passwords having the actual password at the same position with the actual password included in the input password;
   approving the input password for authentication when the approved password list does not include a predetermined number of passwords having the actual password at the same position with the actual password included in the input password irrespective of content of the fake password; and
   refusing to authenticate the input password when the approved password list does include a predetermined number of passwords having the actual password at the same position with the actual password included in the input password; and approving the input password for authentication when the input password includes the actual password, the approved password list does not have the same password with the input password, and the approved password list does not include a predetermined number of passwords having the actual password at the same position with the actual password included in the input password;

wherein the input password comprises the actual password, and fake passwords that are randomly chosen and interspersed by the user.

6. The method of claim 5, further comprising approving the input password for authentication when the input password includes the actual password, and the approved password list does not have the same password with the input password.

7. The method of claim 6, further comprising registering the approved input password to the approved password list.

8. The method of claim 5, further comprising refusing to authenticate the input password when the input password does not include the actual password.

9. The method of claim 5, further comprising refusing to authenticate the input password when the approved password list does not have the same password with the input password.

10. The method of claim 5, with the step of determining whether an input password includes an actual password regardless of the order of the digits in the input password.

11. The method of claim 5, further comprising refusing to authenticate the input password when the approved password list does include a predetermined number of passwords having the actual password at the same position with the actual password included in the input password.

* * * * *